United States Patent [19]

Grosz

[11] Patent Number: 4,996,777

[45] Date of Patent: Mar. 5, 1991

[54] SNAP-IN LEVEL VIAL COVER

[75] Inventor: Imre Grosz, Dollard Des Ormeaux, Canada

[73] Assignee: Johnson Level & Tool Mfg. Co., Inc., Meguon, Wis.

[21] Appl. No.: 500,697

[22] Filed: Mar. 28, 1990

Related U.S. Application Data

[63] Continuation-in-part of Ser. No. 391,492, Aug. 9, 1989.

[51] Int. Cl.$^5$ ........................... G01C 9/24; G01C 9/28
[52] U.S. Cl. ........................................ 33/379; 33/381; 33/384
[58] Field of Search ................. 33/379, 381, 382, 383, 33/384, 389, 390

[56] References Cited

U.S. PATENT DOCUMENTS

| | | |
|---|---|---|
| 3,311,990 | 6/1964 | Wright . |
| 3,738,015 | 6/1973 | De Jong . |
| 4,492,038 | 1/1985 | Mayes . |
| 4,503,623 | 3/1985 | Gould, Jr. . |
| 4,765,061 | 8/1988 | Rawlings et al. . |
| 4,860,459 | 8/1989 | Dengler . |

FOREIGN PATENT DOCUMENTS 3215667 10/1983 Fed. Rep. of Germany ........ 33/379

*Primary Examiner*—William A. Cuchlinski, Jr.
*Assistant Examiner*—Alvin Wirthlin
*Attorney, Agent, or Firm*—Andrus, Sceales, Starke & Sawall

[57] ABSTRACT

A snap-in vial cover for retaining a level-indicating vial on the web of a frame includes first and second vial cover members. The vial cover members are substantially identical in construction. A vial is adapted for placement within a pair of oppositely disposed notches formed in an opening provided in the web of the frame. The first and second members are securable to each other for retaining the vial on the web of the frame.

11 Claims, 3 Drawing Sheets

SNAP-IN LEVEL VIAL COVER

CROSS-REFERENCE TO RELATED APPLICATIONS

This application is a continuation-in-part of application Ser. No. 07/391,492 filed Aug. 9, 1989.

BACKGROUND AND SUMMARY

This invention relates to levels such as those used by carpenters, masons or the like, and more particularly to a holder or cover for use in retaining a level-indicating vial within an opening formed in the web of a level frame.

It is known to mount a level vial within a pair of opposed notches provided in an opening formed in the web of a level frame which extends between spaced working surfaces of the level. One vial retaining system is shown in DeJong U.S. Pat. No. 3,738,015. In the DeJong patent, a pair of retainer caps are provided for affixing the level vial to the level frame. The retainer caps are adapted for mounting one on either side of the web, and each has a pair of hooks for engaging the web at a pair of opposed notches not occupied by the vial. This system involves the separate mounting of both retainer caps to the frame web, independent of any connection of the retainer caps to each other.

It is an object of the present invention to provide an improved vial cover structure which is not dependent on connection to the level frame web for maintaining the cover structure thereon. In accordance with the invention, a vial cover assembly for use in maintaining a vial in position within an opening formed in the web of a level frame includes a first vial cover member and a second vial cover member. The opening formed in the frame has a pair of opposed coaxial notches adapted to receive the ends of the vial. Interlocking means is formed on the first and second vial cover members for securing them to each other so that the web of the frame is sandwiched therebetween. Positioning means is engageable with the frame for fixing the position of the vial cover assembly relative to the frame when the first and second members are secured together as described. Vial-engaging means is provided for engaging the ends of the vial to maintain the vial in position within the notches, and for fixing the vial to the frame when the first and second members are secured together.

In a preferred embodiment, the first and second members are identical in construction, and are formed of a resilient plastic material. The interlocking means comprises a male projection provided on each of the first and second members, spaced oppositely from a female recess. The projection on one of the first and second members is adapted to be received within the recess provided on the other of the members for securing the first and second members together. Structure is preferably provided for allowing a snap-fit of the first and second members together. In a preferred embodiment, each projection includes a lateral protrusion formed at its outer end, which is engageable with a lip which in part defines the recess of the other member. A wall is spaced from the lip, and also in part defines the recess. The wall and lip cooperate to define a narrowed entryway into the recess. The protrusion formed at the outer end of the male projection is wider than the narrowed entry way into the recess, and a wedge-type leading surface is formed on the protrusion. Push-on insertion of the projection into the recess causes the leading surface of the protrusion to engage the lip and the wall spaced therefrom. Continued such movement causes deflection of the wall and of the lip, thus allowing passage of the protrusion into the recess over the lip. Thereafter, the lip and the wall return substantially to their original positions. A lateral biasing force is exerted on the projection by the wall defining the recess. This action urges an angled surface on the protrusion into engagement with an angled surface on the lip, to secure the first and second members together.

An opening is preferably associated with the member in which the recess is formed, which allows access of the tip of a screwdriver or the like for dislodging the protrusion from the lip so as to allow disassembly of the first and second members.

Also in a preferred embodiment, the positioning means engageable with the frame comprises the projections extending through a pair of notches not occupied by the vial. The projections engage the edges of the frame which form the notches, so as to prevent relative movement between the vial cover assembly and the frame when the first and second vial cover members are secured together.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
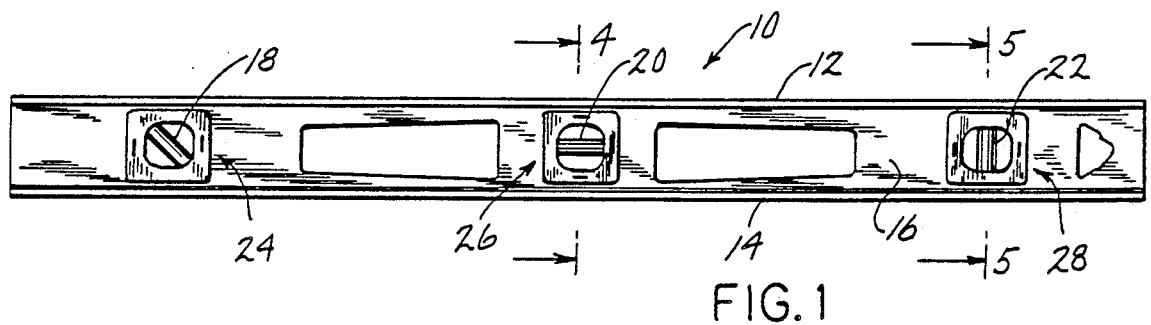
FIG. 1 is a side elevation view of a level incorporating the vial cover assembly of the invention.

Referring to FIG. 1, a level 10 generally includes a frame having an upper working surface 12 and a lower working surface 14, between which spans a web 16. A series of vials 18, 20 and 22 are adapted for mounting within a series of openings formed in web 16. A series of identical vial cover assemblies, shown at 24, 26 and 28, maintain vials 18–22 in position within the openings in web 16.

As is known, vials 18, 20 and 22 are mounted to web 16 so that the longitudinal axes of vials 18, 20 and 22 are disposed in a predetermined angular relationship to the longitudinal axis of level 10, and thereby upper and lower working surfaces 12, 14. As shown, vial 18 is oriented at an angle of 45° relative to surfaces 12, 14. Vial 20 is oriented substantially parallel to surfaces 12, 14, and vial 22 is oriented substantially perpendicular to surfaces 12, 14.

Figure 2:
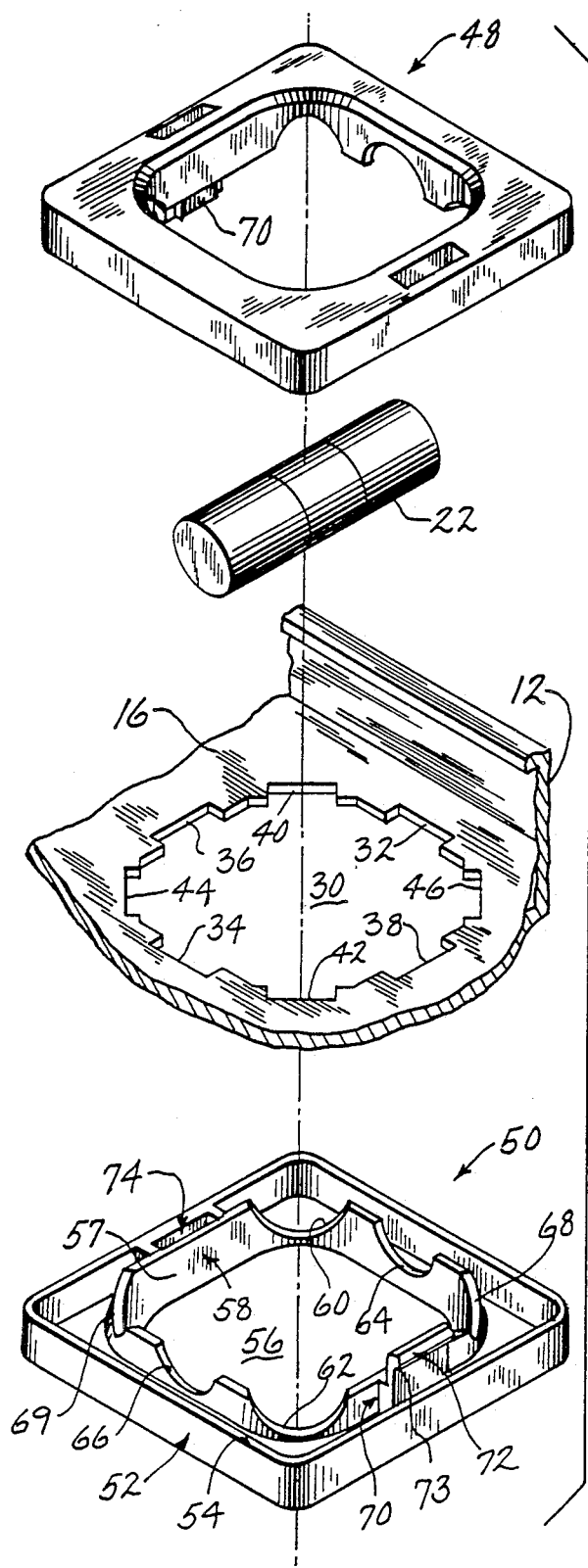
FIG. 2 is an exploded perspective view showing the separate components of the vial cover assembly of the invention, with a portion of the level frame shown partially in section.
Figure 5:
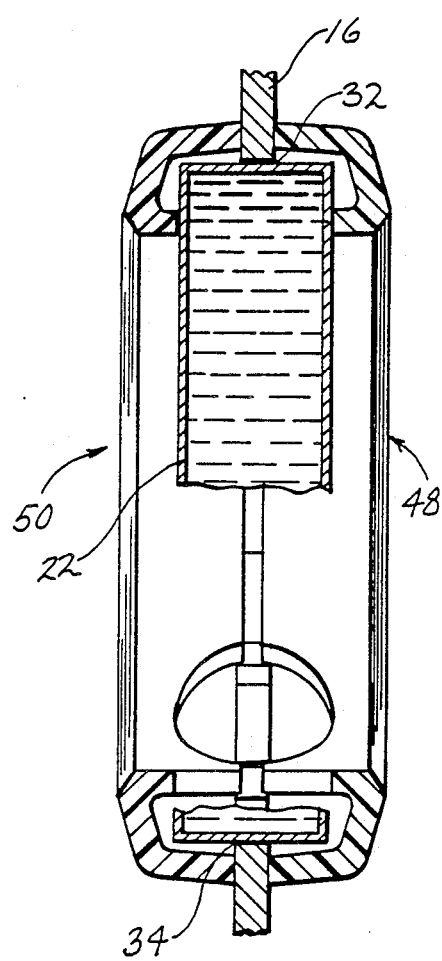
FIG. 5 is a sectional view taken generally along line 5—5 of FIG. 1.

With reference to FIG. 2, an exploded isometric view of the mounting of vial 22 to web 16 is illustrated. As shown, web 16 is provided with an opening 30 which includes a series of opposed notches about its periphery. A first pair of opposed, spaced notches 32, 34 extend along an axis substantially perpendicular to upper working surface 12. A second pair of opposed notches 36, 38 are oriented along an axis extending substantially parallel to upper working surface 12. A third pair of opposed notches 40, 42 are oriented along an axis substantially bisecting the axes of notches 32, 34 and 36, 38. A fourth pair of notches 44, 46 is oriented substantially perpendicular to the axis of notches 40, 42.

Each pair of notches as described above is capable of receiving the ends of vial 22 therewithin. Notches 32–46 are dimensioned so as to provide a close tolerance when vial 22 is placed therewithin, such that there is no movement of vial 22 in either a longitudinal or transverse direction once vial 22 is placed within the selected pair of notches. For illustrative purposes, when vial 22 is placed within notches 32, 34, the longitudinal dimension between the upper surface of notch 32 and the lower surface of notch 34 is substantially equal to the length of vial 22. In a similar manner, the transverse dimension provided by the downwardly extending edges of upper notch 32 and the upwardly extending edges of lower notch 34 is substantially equal to the diameter of vial 22. The same holds true for the other pairs of notches so that regardless of which pair of notches receives vial 22, the position of vial 22 relative to the frame is fixed.

In accordance with known procedures, opening 30 is stamped within web 16 after the blank level frame has been closely positioned in the stamping machine so as to ensure the accuracy of placement of the axes of notches 32–46.

With continued reference to FIG. 2, vial cover assembly 28 includes a first vial cover member 48 and a second vial cover member 50. Members 48, 50 are adapted for mounting to each other on either side of web 16 so as to maintain the position of vial 22 relative to web 16 after placement of vial 22 within notches 32, 34. With members 48, 50 so mounted, web 16 sandwiched therebetween.

Members 48, 50 are identical in construction. Referring to member 50, a peripheral outer wall 52 includes an inner edge 54 which is adapted for placement against one side of web 16. A central opening 56 extends through member 50, with the inwardly facing surface 57 of a wall 58 forming the boundaries of opening 56. Wall 58 is provided with oppositely spaced sets of indentations, shown at 60, 62; 64, 66; and 68, 69. When member 50 is placed against a side of web 16 at opening 30, the inner edge of wall 58 extends partially through the thickness of web 16.

On one side of member 50 a male mounting projection 70 is provided. Projection 70 includes an outwardly extending protrusion 72 formed at its distal end. Protrusion 72 has an angled engaging surface 73 provided on its underside, the purpose of which will be explained. Opposite mounting projection 72 a recess 74 is formed in member 50 between the inwardly facing surface of outer wall 52 and the outwardly facing surface of inner wall 58.

Figure 4:
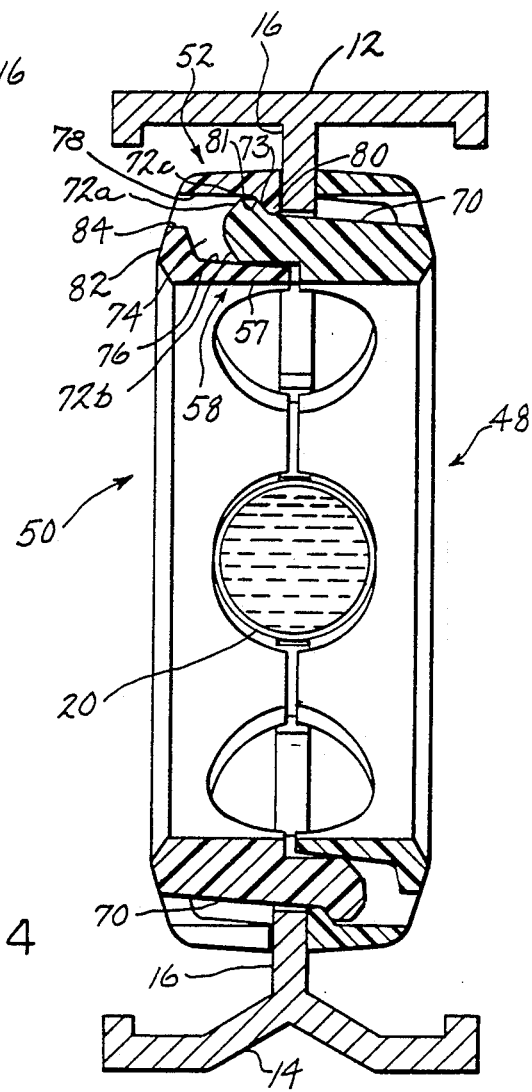
FIG. 4 is a sectional view taken generally along line 4—4 of FIG. 1.

Reference is now made to FIG. 4, which illustrates vial cover assembly 26 in cross-section. As noted previously, vial cover assemblies 24, 26 and 28 are substantially identical in construction, each comprising a first vial cover member 48 and a second vial cover member 50. Reference is made to FIG. 4 to describe the internal construction of recess 74 on member 50. As shown, recess 74 in member 50 is formed by an outwardly facing surface 76 of wall 58, and an inwardly facing surface 78 of wall 52. An inwardly extending lip 80 is formed on inwardly facing surface 78 so as to project into recess 74. Lip 80 includes an angled engaging surface 81 projecting into recess 74. Outwardly facing surface 76 of wall 58 and lip 80 cooperate to define a narrowed entryway to recess 74.

With further reference to FIG. 4, the construction of male mounting projection 70 of member 48 will be described in detail. Protrusion 72 formed at the end of projection 70 defines a width greater than the transverse dimension of the narrowed entryway to passage 74, defined by surface 76 and lip 80. The leading, or outer, end of protrusion 72 is provided with a wedge-type configuration, including angled surfaces 72a and 72b. A surface 72c extends between angled surface 72a and angled engaging surface 73.

With the described construction, a camless molding of members 48, 50 can be achieved due to the structure of projection 70 relative to the outer surface of members 48, 50.

Figure 6:
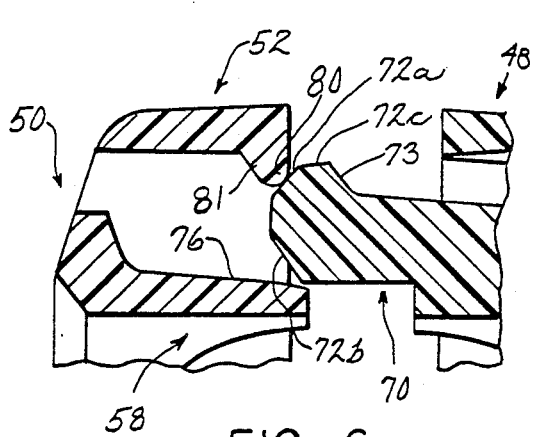
FIG. 6 is an enlarged partial sectional view showing the projection of one of the cover members prior to push-on insertion into the recess of the other cover member.
Figure 7:
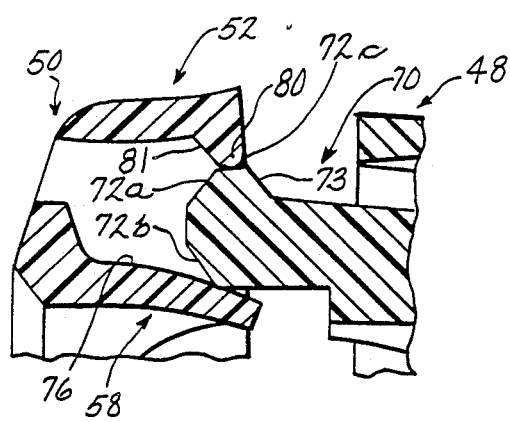
FIG. 7 is a view similar to FIG. 6, showing deflection of the lip and wall of the recess during push-on insertion of the projection.

As shown in FIGS. 4, 6 and 7, members 48, 50 are mounted to web 16 after placement of vial 20 into the appropriate notches by first positioning member 48 such that its male mounting projection 70 is aligned with recess 74 on member 50, and its female mounting recess 74 aligned with male mounting projection 70 on member 50. Members 48, 50 are shown in this position in FIG. 6, with angled surface 72a engaging the outer end of lip 80. Once members 48 and 50 are aligned as described, a push-on force is exerted on both members 48, 50 in a direction substantially transverse to the plane of web 16. Upon application of such force, members 48, 50 attain the position shown in FIG. 7 wherein protrusion 72 is being forced through the narrowed entryway into recess 74. Angled surfaces 72a, 72b engage lip 80 and surface 76 of wall 58, respectively, acting to laterally deflect walls 52 and 58 during passage of protrusion 72 into recess 74. After surface 72c has passed by lip 80, wall 58 exerts a lateral biasing force, due to its resiliency, which causes angled engaging surface 73 of protrusion 72 to ride upwardly on angled surface 81 of lip 80. Angled surfaces 73 and 81 cooperate to secure member 48 and member 50 together, with web 16 sandwiched therebetween, as shown in FIG. 4.

Engaging surfaces 73, 81 are oriented so as to be coplanar when in contact with each other. With the taper of surfaces 73, 81 as shown, members 48, 50 can be satisfactorily mounted to webs having varying thickness. That is, the snap fit of protrusion 72 over lip 80 provides adequate engagement of members 48 and 50 with varying contact area between surfaces 73 and 81 determined by the thickness of web 16. It has been found that web thickness variations up to 0.010 inches can be accommodated in this manner. The biasing force exerted on projection 70 by wall 58 provides adequate friction between surfaces 73 and 81 to prevent disengagement of members 48, 50.

Referring to FIG. 4, recess 74 opens onto an outwardly facing surface 82 of member 50 by means of a passage 84. This structure allows the connection of members 48, 50 to be released by inserting a screwdriver tip or the like through passage 84 and into contact with the distal end surface of projection 70. Upon application of a sharp downward force to the screwdriver, the steps described above and as illustrated in FIGS. 6 and 7 are reversed, thereby releasing members 48, 50. Angled surfaces 73, 81 on projection 70 and lip 80, respectively, facilitate such disengagement of projection 70 from lip 80. With this feature, a broken vial can be removed and replaced with a new vial, and members 48, 50 reused to secure the new vial to web 16.

Projections 70 on members 48, 50 have a width substantially equal to that of notches 32–38. With this construction, when members 48, 50 are secured to web 16 about a vial, any play in the mounting of members 48, 50 to web 16 is prevented by the engagement of the sides of projections 70 with the inwardly extending sides of the notches. This interrelationship of the width of the projections relative to that of the notches is shown clearly in FIG. 3.

With the provision of indentations 60–69 in member 50 and the facing indentations formed correspondingly in member 48, the vial cover assembly formed by members 48, 50 is moveable to the varying configurations as shown in FIG. 1 to secure vials 18, 20 and 22 to web 16. Once the vial has been positioned within the desired set of notches, projections 70 are simply placed within the desired set of notches not occupied by the vial so as to secure the vial to the web.

Figure 3:
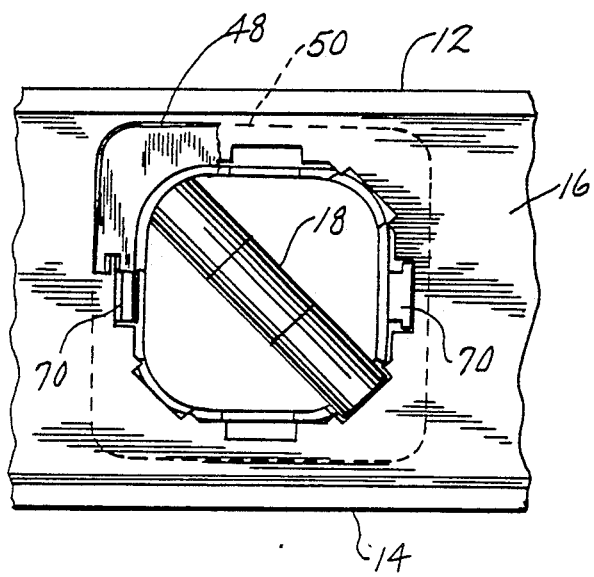
FIG. 3 is an enlarged side elevation view showing the vial cover assembly of the invention, with a portion broken away.

Both opening 30 and members 48, 50 are symmetrical about normal axes extending through their centers. With this arrangement, members 48, 50 are mountable within any of the sets of notches associated with opening 30. In practice, however, members 48, 50 are limited in their positioning to either that as shown in FIG. 3 or that as shown in FIG. 4. The placement of indentations 60–69 allows varying positioning of the vial relative to the web.

Figure 8:
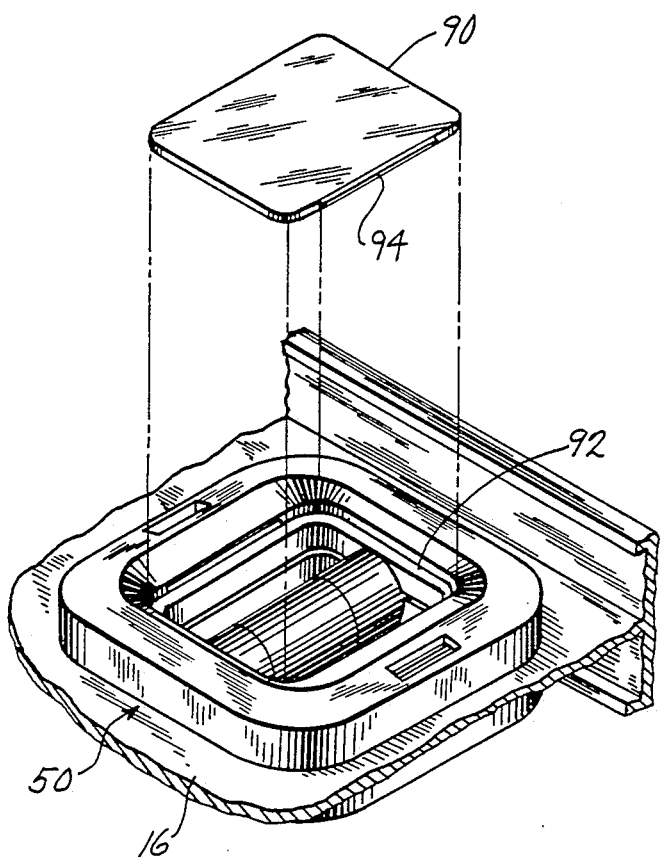
FIG. 8 is a partial isometric view showing a modified vial cover assembly in place on the level frame and a lens for placement on the cover assembly.
Figure 9:
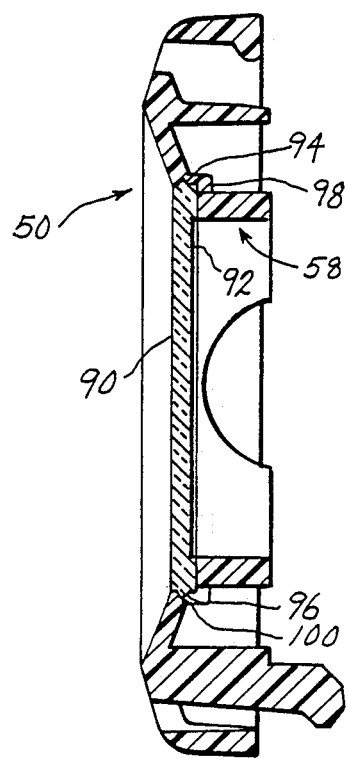
FIG. 9 is a sectional view through one of the vial cover members of the invention, showing a lens assembled thereto.

FIGS. 8 and 9 illustrate the lens cover assembly as shown in FIGS. 1–7 and as described previously, in combination with a transparent lens 90. As shown in FIGS. 8 and 9, the inner wall 58 of cover member 50 is provided with an upwardly facing ledge 92 about its periphery. Lens 90 is adapted for placement onto ledge 92. Along two of its sides, lens 90 is provided with lateral tabs 94, 96, which are received within slots 98, 100 formed above ledge 92 to secure lens 90 to cover member 50.

Various alternatives and modifications are contemplated as being within the scope of the following claims particularly pointing out and distinctly claiming the subject matter regarded as the invention.

I claim:

1. A vial cover assembly for use in securing a vial within an opening formed in the web of a level frame, the opening having a pair of opposed coaxial notches adapted to receive the ends of the vial, comprising:
   a first vial cover member;
   a second vial cover member;
   interlocking means formed on said first and second members for securing said first and second members to each other so that the web of said frame is sandwiched therebetween, said interlocking means comprising a male projection provided on each member spaced oppositely from a female recess provided on each member, with the projection on one of said members being adapted to be received within the recess on the other of said members for securing said first and second members together, and wherein the male projections provided on said first and second members are provided with a lateral protrusion, and wherein the female recesses provided on said first and second members include an inwardly extending lip, said lateral protrusion and said inwardly extending lip including complementary angled surfaces non-parallel to the plane of the web, for accommodating varying thicknesses of the web of said level frame, said angled surfaces engaging each other wherein said first and second members are secured together;
   positioning means engageable with said frame for fixing the position of said vial cover assembly relative to said frame when said first and second members are secured together; and
   vial-engaging means for maintaining the ends of the vial within said notches and fixing the vial to the frame when the first and second members are secured together.

2. The assembly of claim 1, wherein said female recesses are each defined in part by a wall spaced from said lip, said wall engaging said protrusion during push-on insertion of said projection into said recess and deflecting laterally to accommodate passage of said protrusion into said recess, and thereafter returning at least partially to its original position to bias the angled surface of said protrusion against the complementary angled surface on said lip.

3. The assembly of claim 1, wherein the opening in the web of the level frame includes a second pair of opposed notches, and wherein the projections on said first and second members extend through said second pair of notches and into said recesses and engage the edges of said web forming said notches so as to prevent relative movement between said vial cover assembly and said level frame.

4. The assembly of claim 2, wherein the recess in each of said first and second members opens onto a surface which faces outwardly when said first and second members are secured together on the web of said level frame, with the protrusion formed on each said projection being disposed within said recess below said surface, so that the tip of an elongated tool such as a screwdriver or the like can be inserted through said opening for separating said first and second members by dislodging said protrusion from said lip upon application of a substantially linear force.

5. The assembly of claim 1, wherein said vial-engaging means comprises facing indentations formed in said first and second members, so that said indentions receive an end of said vial therebetween when said first and second members are secured together and the edges of said first and second members forming said indentations engage said vial.

6. A level assembly comprising:
   a frame including a web having an opening of a predetermined configuration formed therein, said opening having a pair of opposed coaxial notches oriented at a predetermined angular relationship relative to the longitudinal axis of said frame;
   a level-indicating vial adapted for placement within said opening such that its ends are disposed within said pair of opposed notches; and a vial cover assembly for retaining said vial in place on said frame, comprising a first vial cover member for placement on one side of said frame and a second vial cover member for placement on the other side of said frame, said vial cover members being securable to each other so as to sandwich the web of said frame therebetween and including interlocking means formed on said first and second members for securing said first and second members to each other so that the web of said frame is sandwiched therebetween, said interlocking means comprising a male projection provided on each member spaced oppositely from a female recess provided on each member, with the projection on one of said members being adapted to be received within the recess on the other of said members for securing said first and second members together, and wherein the male projections provided on said first and second members are provided with a lateral protrusion, and wherein the female recesses provided on said first and second members include an inwardly extending lip, said lateral protrusion and said inwardly extending lip including complementary angled surfaces nonparallel to the plane of the web, for accommodating varying thicknesses of the web of said level frame, said angled surfaces engaging each other wherein said first and second members are secured together, and said vial cover members when secured together further including means engageable with said frame for fixing the position of said vial cover assembly relative to said frame, and further including means engageable with said vial for maintaining the ends of said vial within said notches and fixing said vial to said frame.

7. The level assembly of claim 6, wherein the opening in said web includes a second pair of opposed coaxial notches, and wherein said vial is adapted for placement in one of said pairs of notches and the male projections provided on said first and second members extend through the other of said pairs of notches and engage the edges of said web forming said notches so as to fix the position of said vial holder assembly relative to said web.

8. The level assembly of claim 7, wherein said first-mentioned pair of notches is oriented along an axis substantially parallel to the longitudinal axis of said frame, and said second pair of notches is oriented along an axis substantially perpendicular to the longitudinal axis of said frame, and wherein said vial cover assembly accommodates placement of said vial in either of said pairs of notches by the male projections in said first and second members extending through the pair of notches not occupied by said vial.

9. The level assembly of claim 8, wherein the opening of said web includes a third pair of notches oriented along an axis substantially bisecting the axes of said first and second pairs of notches for receiving the ends of said vial, and wherein said first and second vial cover members include means engageable with said vial for maintaining said vial in said third pair of notches when the male projections on said first and second members extend through either said first-mentioned or said second pairs of notches.

10. A level assembly comprising:
a frame including a web having an opening formed therein, said opening having two pairs of opposed notches, each said pair of notches being oriented along an axis having a predetermined relationship relative to the longitudinal axis of said frame;
a level vial adapted for placement within said opening such that its ends are disposed within one of the pairs of opposed notches; and
a snap-in vial cover assembly comprising a first vial cover member and a second vial cover member, said vial cover members being adapted for placement on either side of the web of said frame, each said vial cover member including a male mounting projection and a female mounting recess, said projection and said recess being disposed on opposite sides of said vial cover members, with the projection on one of said members being adapted to be received within the recess on the other of said members for securing said first and second members together, and wherein the male projections provided on said first and second members are provided with a lateral protrusion, and wherein the female recesses provided on said first and second members include an inwardly extending lip, said lateral protrusion and said inwardly extending lip including complementary angled surfaces nonparallel to the plane of the web, for accommodating varying thicknesses of the web of said level frame, said angled surfaces engaging each other wherein said first and second members are secured together, said vial cover members being mounted to said web such that the projections provided on said first and second vial cover members extend through the pair of notches not occupied by said vial and engage the edges of said web forming said notches so as to fix the position of said vial cover assembly relative to said frame, said vial cover assembly further comprising means engaging said vial for maintaining said vial within the pair of notches within which it is mounted when said first and second vial cover members are secured together.

11. The level assembly of claim 10, wherein each said recess opens onto an outwardly facing surface when said first and second members are secured together on the web of said level frame, so that the tip of an elongated tool such as a screwdriver or the like can be inserted through said opening for separating said first and second members by dislodging said protrusion from said lip.

* * * * *